United States Patent
Walters

(10) Patent No.: US 7,026,776 B1
(45) Date of Patent: Apr. 11, 2006

(54) CURRENT LIMITING STRATEGY

(75) Inventor: James E. Walters, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/171,664

(22) Filed: Jun. 30, 2005

(51) Int. Cl.
*H02K 17/32* (2006.01)

(52) U.S. Cl. .................. 318/434; 318/430; 318/432; 318/433

(58) Field of Classification Search ............. 318/434, 318/430, 432, 433, 254, 138, 439, 727, 800, 318/732
See application file for complete search history.

(56) References Cited

U.S. PATENT DOCUMENTS 6,700,339 B1 * 3/2004 Vyssotski et al. ........... 318/254
6,784,634 B1 * 8/2004 Sweo ........................ 318/727

* cited by examiner

*Primary Examiner*—Karen Masih
(74) *Attorney, Agent, or Firm*—Paul L. Marshall

(57) ABSTRACT

The invention provides a method for controlling current in a direct current motor having a back emf constant ($k_e$), which may be a function of field current if the direct current motor is a field wound machine, and motor resistance ($R_s$) in all 4 quadrants of operation. The method includes the step of rotating a motor shaft of the direct current motor with a controller by applying a first voltage across the direct current motor's terminals. The first voltage corresponds to a first value of current passing through the armature windings of the direct current motor. The method also includes the step of determining a maximum value of current to pass through the armature windings of the direct current motor. The maximum value of current is selected to prevent undesirable over current conditions, such as thermal overload as one example. The method also includes the step of receiving a signal corresponding to a desired motor speed ($\omega^*$) with the controller during the rotating step. The method also includes the step of first computing a second voltage to replace the first voltage from the controller after the receiving and determining steps and in view of the estimates of the back emf constant ($k_{e\_est}$) and the armature resistance ($R_{est}$) of the direct current motor. The method also includes the step of limiting the second voltage, if necessary to limit the current, before replacing the first voltage based at least in part on a difference between the maximum value of current and the current polarity, a gain quantity, and the first value of current and voltage in order to dynamically control current during the operating step.

13 Claims, 3 Drawing Sheets

CURRENT LIMITING STRATEGY

FIELD OF THE INVENTION

The invention relates to direct current motors and more specifically to a method for controlling the current passing through a direct current motor in all four quadrants of operation.

BACKGROUND OF THE INVENTION

In simplified direct current motor drives as are typically used in wheelchair and forklift applications, it can be necessary to protect the machine and electronics from thermal overload conditions as well as high current fault conditions as may occur if a winding short were to develop. Thermal overload conditions can occur when current greater than the continuous rated value is directed through the motor drive for extended time periods. Often, speed information is not available in the applications cited above due to cost reasons so a cascaded speed and current loop, or torque loop, is not applicable. Furthermore, the desired command to the vehicle is a speed command as opposed to a torque command which precludes using a torque, or current loop, for control. A control technique known as IR drop compensation is sometimes used to provide approximate speed control, but does not inherently provide any current protection. If an operating mode occurs in which the wheels are unable to turn and the compensation is properly tuned, this control mode will lead to a large increase in current which requires some form of current limiting to properly protect the motor, power electronics and user. Protection against excessive current can be afforded by a circuit breaker or fuse. However, these devices require the operator to take steps, such as replacing a fuse, in order to re-engage the motor drive. There are operating conditions where this can lead to the loss of desired protective functionality to the user. In addition, current protection can be provided in the electronic hardware by limiting the gate switching command periods; although this will not protect the drive over four quadrant operation.

SUMMARY OF THE INVENTION

The invention provides a method for controlling current in a direct current motor in all four quadrants of torque speed operation. Full four quadrant operation is desirable since the motor drive is expected to work with positive and negative torque (current) and positive and negative speed over its operating region. Current limiting operation is inherently different for cases with positive and negative current.

The method includes the step of rotating a motor shaft of the direct current motor with a controller by applying a first voltage across the direct current motor's terminals. The first voltage causes a first current to pass through armature windings of the direct current motor. The method also includes the step of selecting a maximum allowable amount of current to pass through the armature windings of the direct current motor. The maximum amount of current is selected to prevent undesirable over-current conditions, such as thermal overload as one example. The method also includes the step of sending a signal corresponding to a desired motor speed to the controller and converting this signal into a no-load voltage command during the operating step. The method also includes the step of setting a variable related to the estimated electrical resistance of the direct current motor to compensate for loads on the machine's shaft so that IR drop compensation control can be implemented. The method also includes the step of first computing a second voltage to replace the first voltage from the controller and determining whether the first current needs to be limited. Based on the current polarity and magnitude a new allowable voltage value is calculated that will limit the current to the desired current limit value. The invention provides simply and easily for four quadrant current control in applications where processing power is limited, no shaft position sensing is available, and a simple low cost implementation is desired.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
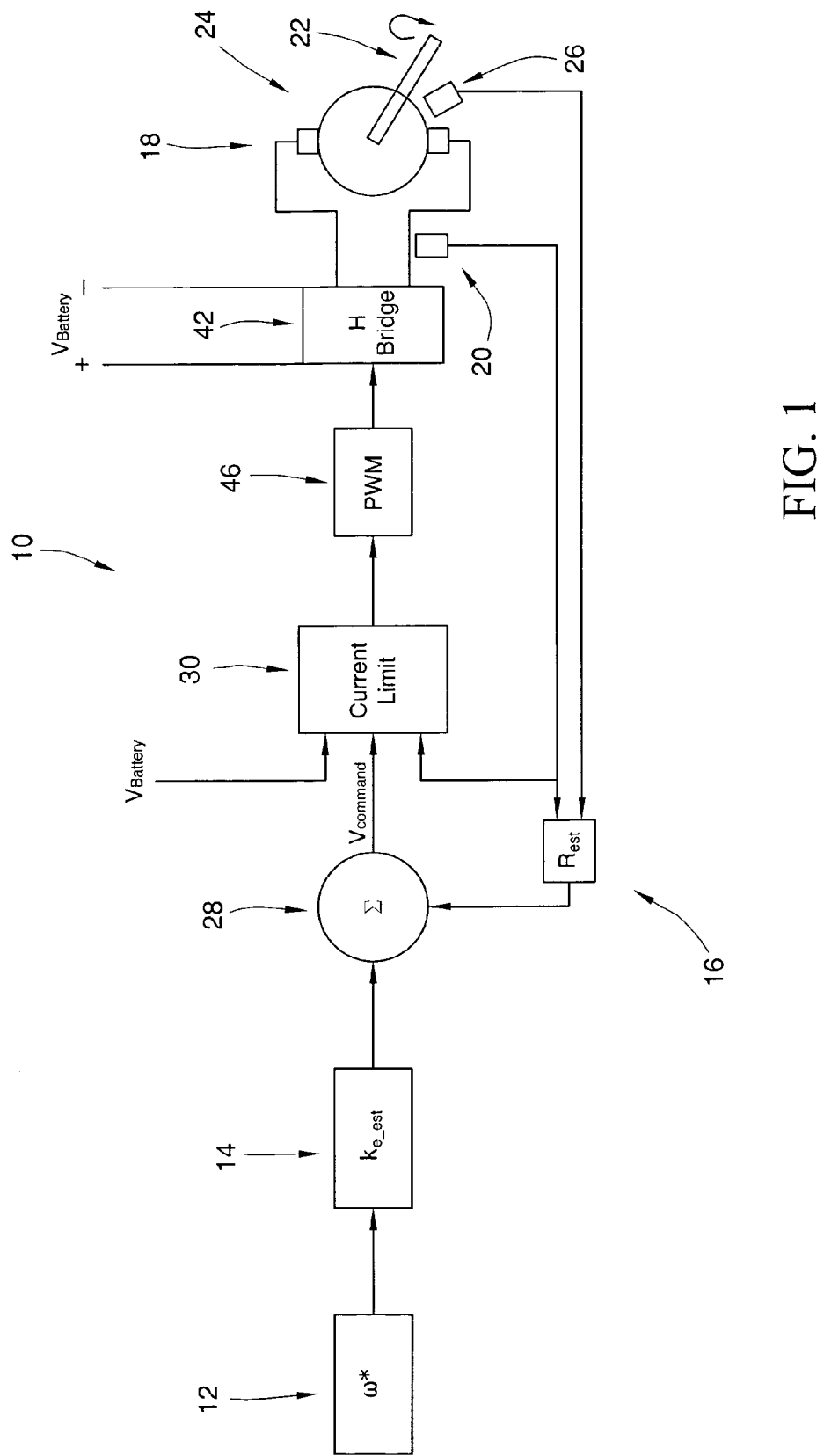
FIG. 1 is a simplified flow diagram showing a control strategy for limiting current by controlling voltage.

The invention provides a method for controlling current in a direct current motor 18 having a back emf constant $k_e$ and resistance $R_s$. The motor may have either a permanent magnet or a field winding to create the needed magnetic flux that determines in part the value of $k_e$. The value of $k_e$ is generally constant for a magnet machine but can vary with a field wound machine. For the case of a field winding motor, the value of $k_e$ will change based on the value of the field current. A basic form of steady state speed control, IR drop compensation, can be created by recognizing that for a given desired speed the motor voltage must be equal to the sum of the current and $R_s$ product and the emf voltage which is simply the product of $k_e$ and rotational speed. These values are not truly known to the controller and are designated $k_{e\_est}$ and $R_{est}$. FIG. 1 is a simplified schematic diagram of the exemplary embodiment of the inventive method, wherein the steps are performable by a controller. The method includes the step of rotating a motor shaft 22 of the direct current motor 18 with the controller by applying a first voltage across the direct current motor's terminals 18. The application of the first voltage corresponds to establishing a given amount of current passing through the armature windings 24 of the direct current motor 18 with the actual amount dependent upon load and machine parameters.

The method also includes the step of selecting a maximum allowable amount of current to pass through the armature windings 24 of the direct current motor 18. The maximum amount of current is selected to prevent undesirable over-current conditions, such as thermal overload as one example. The maximum amount of current will be discussed in greater detail below.

The method also includes the step of receiving a signal corresponding to a desired motor speed $\omega^*$ at the controller during the operating step. At step 12, a desired speed $\omega^*$ is determined by the operator and a signal corresponding to the desired speed is received by the controller. The desired speed ω* can be communicated with a throttle-like device such as pedal or a joystick. At step 14, the speed ω* is multiplied by an estimated back emf constant $k_{e\_est}$ of the direct current motor 18. The product of the speed ω* and the estimated back emf constant $k_{e\_est}$ forms one component of an equation for determining voltage that will be set forth below which is related to the voltage required to operate the machine with no load at the speed ω*.

The method also includes the step of determining the second component of an equation determining voltage which is dependent on the load placed on the shaft 22. An estimate of the motor resistance, $R_{est}$, in conjunction with a measured current value is used to estimate the current and $R_s$ product, or load, term. A sensor 20 is used to measure the current through the armature winding 24 to sense the amount of current presently passing through the direct current motor 18. The motor resistance, $R_s$, and back emf constant of the machine, $k_e$, are both dependent on the machine's temperature. In the exemplary embodiment of the invention, a temperature sensor 26 communicates a signal corresponding to a temperature of at least a portion of the direct current motor 18 to enhance the estimation of the electrical resistance $R_{est}$ and $k_{e\_est}$.

The method also includes the step of first computing a second voltage to replace the first voltage from the controller after the receiving and determining steps. At step 28, to determine the second voltage, the controller completes the voltage equation:

$$V_{Command} = ((I_{meas})(R_{est})) + ((k_{e\_est})((\omega)^*))$$

Figure 2:
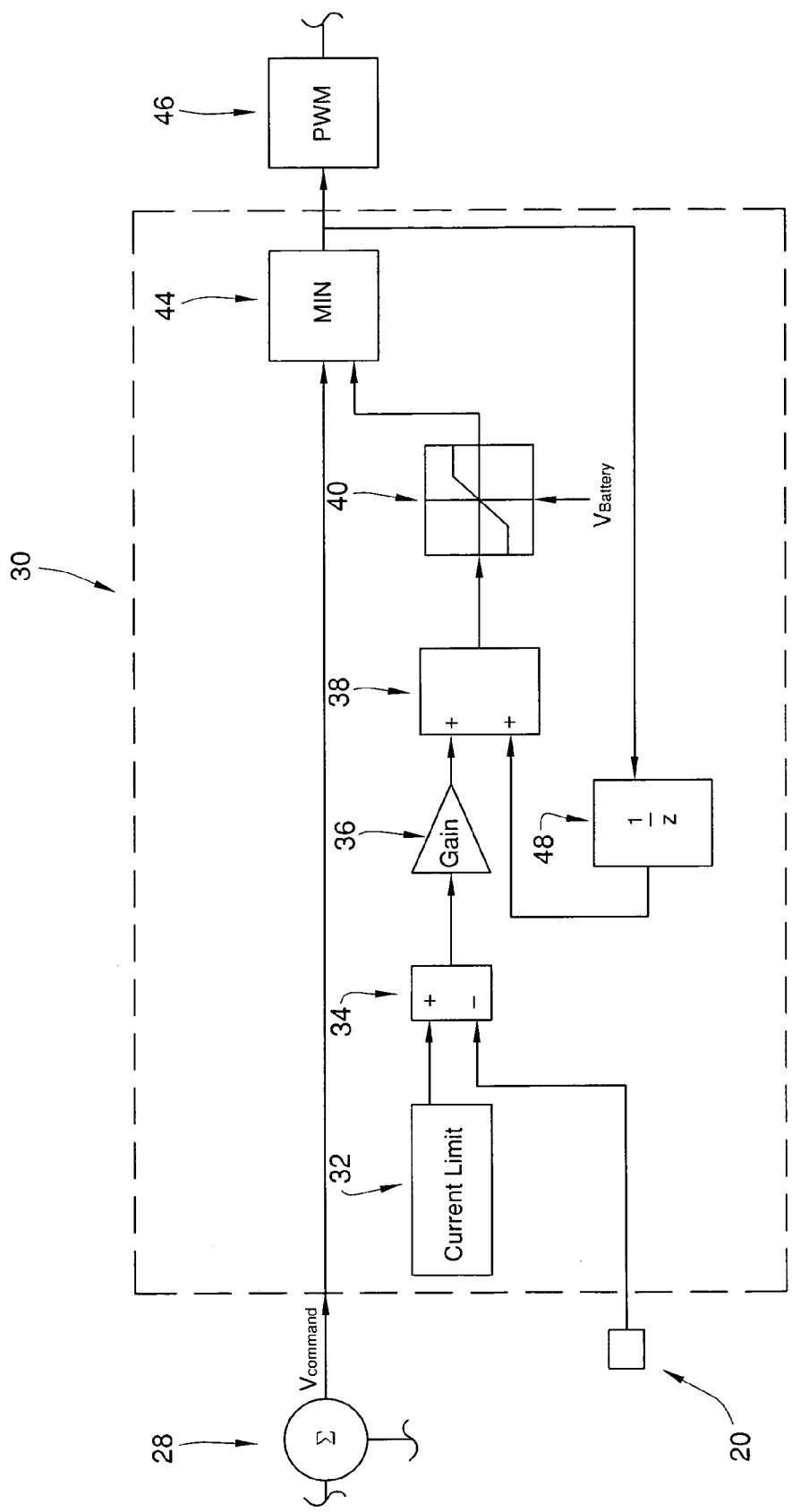
FIG. 2 is a simplified flow diagram showing a detailed view of the current limiting box shown in FIG. 1 when current is positive.

The method also includes the step 30 of limiting the second voltage before replacing the first voltage based at least in part on a difference between the maximum amount of current and the first amount of current to dynamically control current during the operating step. Referring to FIG. 2, in the exemplary embodiment of the invention where current is positive, the step 30 includes a step 32 where the current limit is either calculated or recalled from a stored memory device. At step 34, the current sensor 20 communicates a signal indicative of the first level of current. This value is subtracted from the maximum permitted current to determine a current difference. At step 36, the current difference is multiplied by the gain 36 to determine the permissible delta voltage amount. The setting of the gain 36 is dependent on how fast the current limiter is desired to respond. In other words, at step 36, the maximum permissible voltage change is determined based on the difference of the present current value and the maximum desirable current, or current limit, multiplied by a gain. This maximum permissible voltage increase is a third voltage.

At step 38, a fourth voltage is defined by combining the third voltage and the first voltage. The fourth voltage represents the maximum permissible voltage that should be applied across the direct current motor 18 to prevent exceeding the desired current limit. The fourth voltage is based in part on the third voltage which, as set forth above, is based in part on the current limit. As result, the fourth voltage is also based in part on the current limit.

At step 40, a saturation block ensures that the fourth voltage does not exceed predetermined limits. The predetermine limits of block 40 are in actuality based in part on the available battery voltage. The saturation block is desirable because an H bridge 42, to be described in greater detail below and shown in FIG. 1, can only generate voltage over a set range based on the available battery voltage. The second voltage described above will have been already limited to this range. The saturation block ensures the same limit as to range for the fourth voltage. The saturation block could be applied after a comparison step 44, to be described in greater detail below, without much effect. There are a couple of operating conditions, such as going down a steep hill in a wheelchair that overpowers the chair for instance, that can be created in which not having the saturation block could be especially important. The fourth voltage may be reduced at step 40 to the predetermined voltage limit range where the fourth voltage resulting from step 38 is outside the predetermined allowable voltage limit range.

At step 44, the second voltage and the fourth voltage are compared. The lesser of the second voltage and the fourth voltage is selected to replace the first voltage. The selected voltage is communicated to a pulse width modulator 46 and then to the H bridge 42. The pulse width modulator 46 and the H bridge 42 cooperate to apply a revised voltage across the direct current motor 18. As a result, the first voltage, if it is replaced by the fourth voltage, is changed at least in part on a difference between the maximum allowable current and the first value of current. Further, the exemplary method allows for dynamic control of current during operation of the direct current motor 18 when the motor shaft 22 is moving in either direction or stationary.

In the exemplary embodiment of the invention, the revised voltage is also communicated to a unit delay 48. The unit delay 48 confirms that the revised voltage has been applied for a predetermined period of time prior to step 38. The signal communicated from the unit delay 48 to the step 38 is the first voltage.

Figure 3:
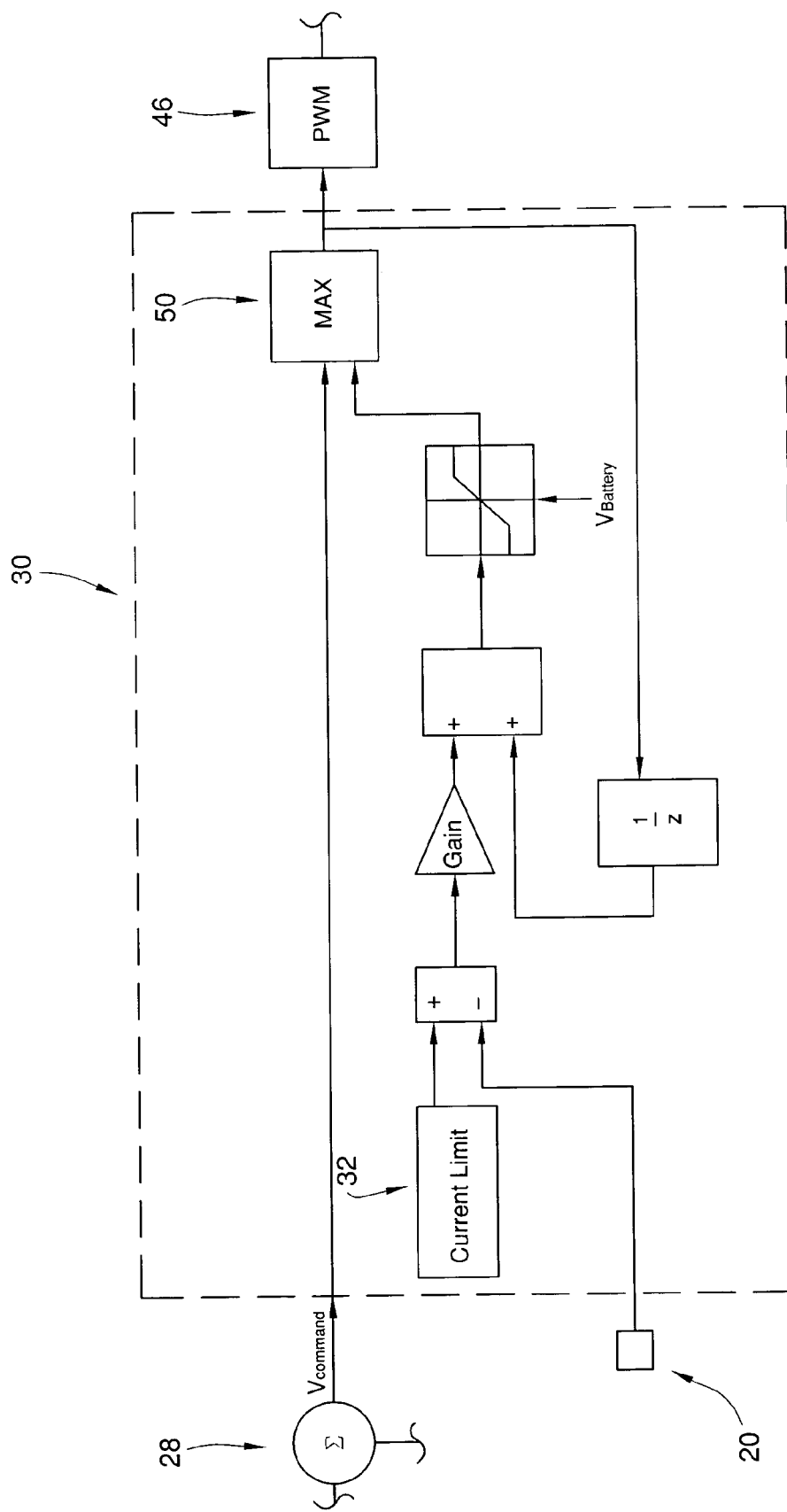
FIG. 3 is a simplified flow diagram showing a detailed view of the current limiting box shown in FIG. 1 when current is negative.

FIG. 3 shows the exemplary embodiment of the invention where current is negative. The operation of the schematic diagram shown in FIG. 3 is substantially similar to the operation of the schematic diagram shown in FIG. 2 except step 50 replaces step 44. At step 50, the second voltage and the fourth voltage are compared and the greater of the second voltage and the fourth voltage is selected to replace the first voltage. In addition, the current limit 32 in this case will have a negative value. In this case, it can be seen that a current limiting operation must inherently increase the voltage to the motor which is why any scheme that only reduces the applied voltage is not truly capable of 4 quadrant operation. From the effect of the current limiter, the current will thus be limited between the positive and negative values set for the current limit.

It should be noted that the current limit can be changed during operation of the drive system with the proposed limiter. For example, the peak or maximum current can be limited based on the particular power stage in which the direct current motor 18 is operating. In a wheelchair application, this may occur when climbing a long hill or if the wheels are locked. At some point, the direct current motor 18 or power stage thermal protection algorithms stored in memory of the controller will indicate that a much lower current limit is needed. In this case the current limit must be lowered while the current is being limited. As a result, it is preferred that the current limit at step 32 is designed so that the limit can be changed dynamically. It may be expected that current can be easily limited by changing voltage, but, especially if the system includes a 4 quadrant drive, changing the current limit is more complex than just lowering the voltage. In some cases the voltage must be raised to limit current and transitions from positive current to negative current can occur quickly based on whether the vehicle is going uphill or downhill or quickly changing between the two.

The invention can also advantageously address an operating condition that can be encountered in a drive system for wheelchair that can be undesirably addressed by a fuse or other known current limiting device which simply reduces voltage. In the case where a wheelchair starts down a very steep hill, a normal IR drop control would begin to command voltage that would allow a negative current to develop in order to apply negative torque to attempt to brake the chair and maintain the speed at the commanded value. If the slope were steep enough, the current level could decrease such that the negative current limit were reached. In this case, the voltage would be negatively constrained in order to limit the current to this value. Reducing the current limit further would actually require a higher voltage, not a lower voltage, to protect the drive. Opening a fuse or breaker would result in an increase in speed since there would be no load to oppose the effect of gravity. In addition, simply lowering the voltage would actually lead to greater current in this case. Finally, for cases with even steeper hills where the positive voltage limit of the drive is reached, the invention allows for the maximum amount of breaking to torque to be applied to attempt to limit the speed.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling current in a direct current motor having a back emf constant ($k_e$) and motor resistance ($R_s$) comprising the steps of:
    rotating a motor shaft of the direct current motor with a controller by applying a first voltage across the direct current motor corresponding to a first current value passing through armature windings of the direct current motor;
    determining a maximum value of current to pass through the armature windings of the direct current motor;
    receiving a signal corresponding to a desired motor speed ($\omega$) with the controller during said rotating step;
    first computing a second voltage with the controller to replace the first voltage after said receiving and determining steps and in view of the back emf constant ($k_e$) and motor resistance ($R_s$) of the direct current motor; and
    limiting the second voltage before replacing the first voltage based at least in part on a difference between the maximum value of current and the first value of current to dynamically control current during said operating step.

2. The method of claim 1 wherein said limiting step further comprises the step of:
    sensing the first value of current with a first current sensor.

3. The method of claim 2 wherein said limiting step further comprises the step of:
    subtracting the first value of current from the maximum allowable value of current to determine a current difference value.

4. The method of claim 3 wherein said limiting step further comprises the step of:
    computing a third voltage based on the current difference value.

5. The method of claim 4 wherein said limiting step further comprises the step of:
    defining a fourth voltage by combining the third voltage and the first voltage.

6. The method of claim 5 wherein said limiting step further comprises the step of:
    replacing the first voltage with the lesser of the fourth voltage and the second voltage when current is positive.

7. The method of claim 5 wherein said limiting step further comprises the step of:
    replacing the first voltage with the greater of the fourth voltage and the second voltage when current is negative.

8. The method of claim 7 further comprising the step of:
    changing the maximum value of current during said operating step.

9. The method of claim 8 further comprising the step of:
    comparing the fourth voltage to a predetermined voltage limit range after said defining step and before said replacing step.

10. The method of claim 9 further comprising the step of:
    increasing the fourth voltage to the predetermined voltage limit if the fourth voltage is initially less than the predetermined voltage limit.

11. The method of claim 9 further comprising the step of:
    reducing the fourth voltage to the predetermined voltage limit if the fourth voltage is initially greater than the predetermined voltage limit.

12. The method of claim 11 further comprising the step of:
    applying the first voltage for a predetermined period of time prior to said defining step.

13. The method of claim 12 wherein said determining the electrical resistance and back emf step further comprises the steps of:
    sensing a temperature of at least a portion of the direct current motor with a temperature sensor.

* * * * *